US010390338B2

(12) United States Patent
Wang et al.

(10) Patent No.: US 10,390,338 B2
(45) Date of Patent: Aug. 20, 2019

(54) GENERIC PHYSICAL LAYER DOWNLINK CONTROL INFORMATION DESIGN

(71) Applicant: AT&T INTELLECTUAL PROPERTY I, L.P., Atlanta, GA (US)

(72) Inventors: Xiaoyi Wang, Austin, TX (US); SaiRamesh Nammi, Austin, TX (US); Arunabha Ghosh, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 263 days.

(21) Appl. No.: 15/349,982

(22) Filed: Nov. 11, 2016

(65) Prior Publication Data

US 2018/0139730 A1     May 17, 2018

(51) Int. Cl.
    *H04W 4/00*         (2018.01)
    *H04W 72/04*       (2009.01)
    *H04L 1/00*         (2006.01)
    *H04L 5/00*         (2006.01)

(52) U.S. Cl.
    CPC ......... *H04W 72/042* (2013.01); *H04L 1/0007* (2013.01); *H04L 1/0017* (2013.01); *H04L 1/0039* (2013.01); *H04L 5/00* (2013.01)

(58) Field of Classification Search
CPC combination set(s) only.
See application file for complete search history.

(56) References Cited

U.S. PATENT DOCUMENTS

| 8,891,474 | B2 | 11/2014 | Aiba et al. |
| 9,345,044 | B2 | 5/2016 | Tang |
| 9,881,273 | B2 * | 1/2018 | Yang .................. G06Q 10/0833 |
| 2011/0283171 | A1 * | 11/2011 | Siew .................... H04L 1/0079 |
| | | | 714/807 |

(Continued)

FOREIGN PATENT DOCUMENTS

| WO | 2012171224 | 12/2012 |
| WO | 2016018079 | 2/2016 |

OTHER PUBLICATIONS

Wu, Yu-chun, et al. "A New Downlink Control Channel Scheme for LTE." Vehicular Technology Conference (VTC Spring), 2013 IEEE 77th. IEEE, 2013. 6 pages.

(Continued)

*Primary Examiner* — Anh Vu H Ly
(74) *Attorney, Agent, or Firm* — Amin, Turocy & Watson, LLP

(57) ABSTRACT

A base station device can adaptively assemble the downlink control information using a plurality of information segments and then transmit the assembled downlink control information to a mobile device. The information segments can each represent different control functions and the base station device can select relevant and appropriate information segments to include in the downlink control information based on the features represented in the downlink data transmission and the mobile device. If the downlink data transmission does not have a certain feature, the base station device can leave the information segment relevant to the (Continued)

feature out of the downlink control information. Additionally, when new features are introduced, new information segments can be added without defining a new downlink control information format.

20 Claims, 11 Drawing Sheets

(56) References Cited

U.S. PATENT DOCUMENTS

| | | | |
|---|---|---|---|
| 2012/0147842 A1* | 6/2012 | Sato | H04W 72/08 370/329 |
| 2013/0242947 A1 | 9/2013 | Chen et al. | |
| 2015/0230205 A1 | 8/2015 | Lin | |
| 2015/0312071 A1 | 10/2015 | Chen et al. | |
| 2016/0007357 A1* | 1/2016 | Yano | H04L 1/00 370/329 |
| 2016/0088530 A1 | 3/2016 | Uchino et al. | |
| 2016/0100382 A1 | 4/2016 | He et al. | |
| 2016/0128028 A1* | 5/2016 | Mallik | H04W 72/042 370/336 |
| 2016/0242156 A1 | 8/2016 | Kim et al. | |
| 2016/0330725 A1 | 11/2016 | Aiba et al. | |
| 2016/0337102 A1 | 11/2016 | Xin et al. | |
| 2016/0338023 A1 | 11/2016 | Nogami et al. | |

OTHER PUBLICATIONS

Wu, Muzi, et al. "Performance analysis of physical downlink and uplink channels in TD-LTE system." Communication Technology (ICCT), 2010 12th IEEE International Conference on. IEEE, 2010. 4 pages.

* cited by examiner

GENERIC PHYSICAL LAYER DOWNLINK CONTROL INFORMATION DESIGN

TECHNICAL FIELD

The present application relates generally to the field of mobile communication and, more specifically, to a generic physical layer downlink control information format.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G standards.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
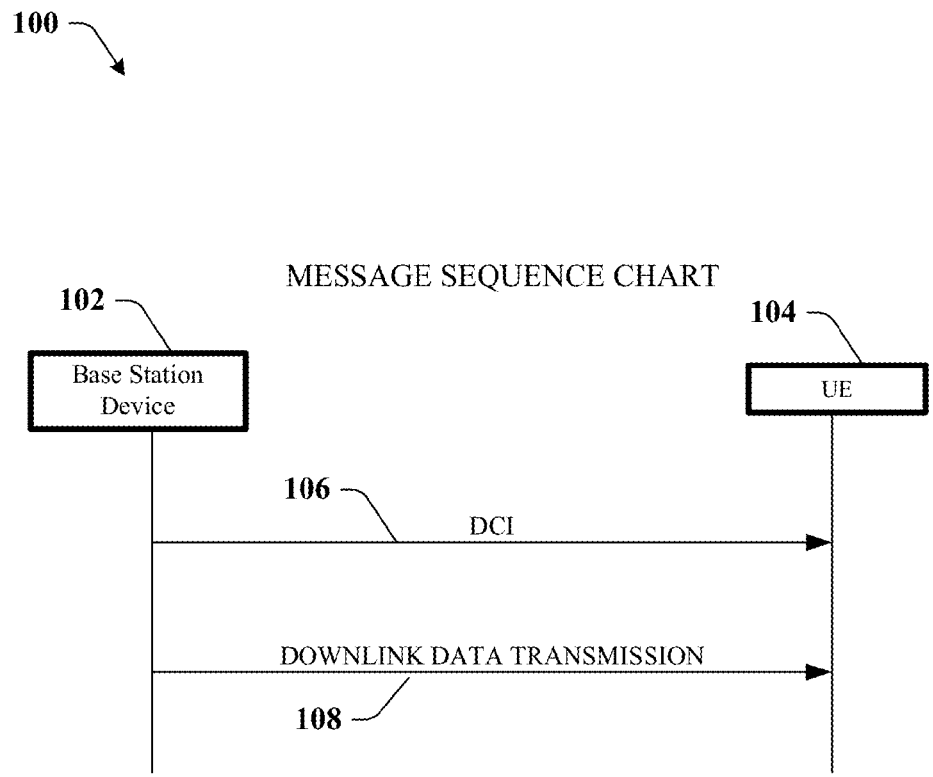
FIG. 1 illustrates an example schematic block diagram of a message sequence chart for downlink control information in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

In various embodiments, a base station device can comprise a processor and a memory that stores executable instructions that, when executed by the processor facilitate performance of operations. The operations can include determining that a downlink to a mobile device is to be established. The operations can also include assembling downlink control information for the downlink to the mobile device from a group of information segments, wherein the downlink control information comprises an information segment of the group of information segments, and wherein the information segment is associated with a signaling control for the downlink. The operations can also include transmitting an index to the mobile device, wherein the index comprises information identifying the information segment and a size of the information segment. The operations can also include transmitting the downlink control information to the mobile device in response to transmitting the index to the mobile device.

In another embodiment, a mobile device can include a processor and a memory that stores executable instructions that, when executed by the processor facilitate performance of operations. The operations can include receiving a first transmission from a base station device comprising an index identifying an information segment and a number of bits of the information segment. The operations can also include receiving a second transmission from the base station device, wherein the transmission comprises downlink control information comprising the information segment. The operations can also include identifying the information segment in the downlink control information based on the index and the number of bits in the downlink control information. The operations can also include interpreting indicator bits in the information segment based on matching the information segments to the index.

In another embodiment a method can include determining, by a network device comprising a processor, that a downlink to a mobile device is to be established. The method can also include assembling, by the network device, downlink control information for the downlink to the mobile device from information segments, wherein the downlink control information comprises an information segment of the information segments, and wherein the information segment is associated with a signaling control for the downlink. The method can also include transmitting an index to the mobile device, wherein the index comprises information identifying the information segment and a size of the information segment. The method can also include transmitting, by the network device, the downlink control information to the mobile device in response to transmitting the index.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

Turning now to FIG. 1, illustrated is an example schematic block diagram 100 of a message sequence chart for downlink control information in accordance with various aspects and embodiments of the subject disclosure.

In an embodiment, a base station device 102 can transmit data to a UE 104 via a downlink channel Before transmitting the downlink data transmission 108 however, the base station device 102 can send downlink control information 106 to the UE 104 to inform the UE 104 about the physical transmission parameters for the downlink data. The downlink control information comprises information related to the downlink data such as which slots and modulation schemes the data will comprise, which resource blocks carry the data, what kind of demodulation scheme is needed to demodulate the data. The UE 104 first decodes the downlink control information 106 and then based on the information decoded, the UE 104 can receive and decode the downlink data transmission 108.

Traditionally, the downlink control information comprises one of several formats defined by the 3GPP specification. As different features may require different transmission information to be included in the downlink control information, there are a large number of predetermined downlink control information formats.

In the embodiment disclosed herein, the base station device 102 can adaptively assemble the downlink control information 106 using a plurality of information segments and then transmit the assembled downlink control information 106 to the UE 104. The information segments can each represent different control functions and the base station device 102 can select relevant and appropriate information segments to include in the downlink control information 106 based on the features represented in the downlink data transmission and the UE 104. If the downlink data transmission does not have a certain feature, the base station device 102 can leave the information segment relevant to the feature out of the downlink control information 106. Similarly, if the context and/or situation of the UE 104 means that certain signaling requirements won't be required, the base station device 102 can leave the information segments out of the downlink control information 106. Additionally, when new features are introduced, new information segments can be added without defining a new downlink control information format.

In an embodiment, the base station device 102 can include a database that comprises an index of the information segments. The information segments can be grouped into subgroups or subset based on the function of the information segment and what the information segments signal. For instance a first group of the information segments can comprise information related to resource allocation. A second group of the information segments can comprise new data indicators, a third group of the information segments can comprise information associated with modulation and coding scheme tables, a fourth group of information segments can comprise information related to the hybrid automatic repeat requests that are related to error control in the physical layer. A fifth group of information segments can comprise information related to the antenna ports. Each of the information segments can be a different size based on the number of bits required to signal the relevant information. The index can include the bit size information along with the information segments.

A non-exclusive, exemplary list of the types of information segments included in the index is as follows:
  a. Resource Allocation type-1 (10 bits to indicate resource in a group of PRB granularity)
  b. Resource Allocation type-2 (30 bits to indicate resource in PRB granularity)
  c. Resource Allocation type-3 (8 bits to indicate a group of continuous PRBs)
  d. New Data Indicator for TB-1.
  e. New Data Indicator for TB-2.
  f. MCS table type-1 (4 bits, fixed 16 different levels of MCS) for TB-1.
  g. MCS table type-2 (5 bits, fixed 32 different levels of MCS) for TB-1.
  h. MCS table type-3 (4 bits, configurable 16 levels of MCS) for TB-1: The states of each MCS can be configured. E.g. 0000 can be configured to be QPSK 1/3 coding rate, or QPSK 8/9 coding rate)
  i. MCS table type-1 (4 bits, fixed 16 different levels of MCS) for TB-2.
  j. MCS table type-2 (5 bits, fixed 32 different levels of MCS) for TB-2.
  k. MCS table type-3 (4 bits, configurable 16 levels of MCS) for TB-2: The states of each MCS can be configured. E.g. 0000 can be configured to be QPSK 1/3 coding rate, or QPSK 8/9 coding rate)
  l. Joint Transport Block Information:
    i. MCS table for TB-1 (4 bits)
    ii. Differential MCS table for TB-2 (3 bits)
  m. HARQ process number type-1 (3 bits: 8 processes)
  n. HARQ process number type-2 (4 bits: 12 processes)
  o. Joint antenna port(s), scrambling identity and number of layers—3 bits with configurable states.
  p. Joint antenna port(s), scrambling identity and number of layers—4 bits with configurable states.

In an embodiment, the DCI 106 can include two transmissions. The first transmission can include an index, prepared by the base station device 102 listing the information segments that will be present in the downlink control information. The index can list the types of information segments, function of the information segments, and the size of the information segments. The second transmission can then be the downlink control information comprising the set of information segments listed in the index sent in the first transmission. When the UE 104 receives the second transmission, the UE 104 can decode the downlink control information using the index sent in the first transmission. By knowing the types of information segments, and the sizes of the information segments in the index received by the UE 104, the UE 104 can deconcatenate the downlink control information into the respective information segments, and interpret the indicator bits accordingly when receiving the downlink data.

The size of the downlink control information 106 can be the sum of the sizes of each of the information segments selected by the base station device 102. The UE 104 can receive the downlink control information 106, and unlike using a predetermined format for the DCI (e.g., Format 0, 1A, 1B, etc), the UE 104 may not immediately know how to interpret the downlink control information. To interpret the downlink control information 106, the UE 104 decodes the downlink control information 106 by deconcatenating the downlink control information into individual, identifiable information segments and then interprets the signaling bits as it would for a predetermined DCI format. The UE 104 can determine the total size of the downlink control information 106. Based on the total size, and using a similar index of information segments that list the sizes of the information segments, the UE can determine which information segments have been included in the downlink control information 106 and identify where bits of one end, and the bits of another information segment begin in order to properly interpret the downlink control information.

Figure 2:
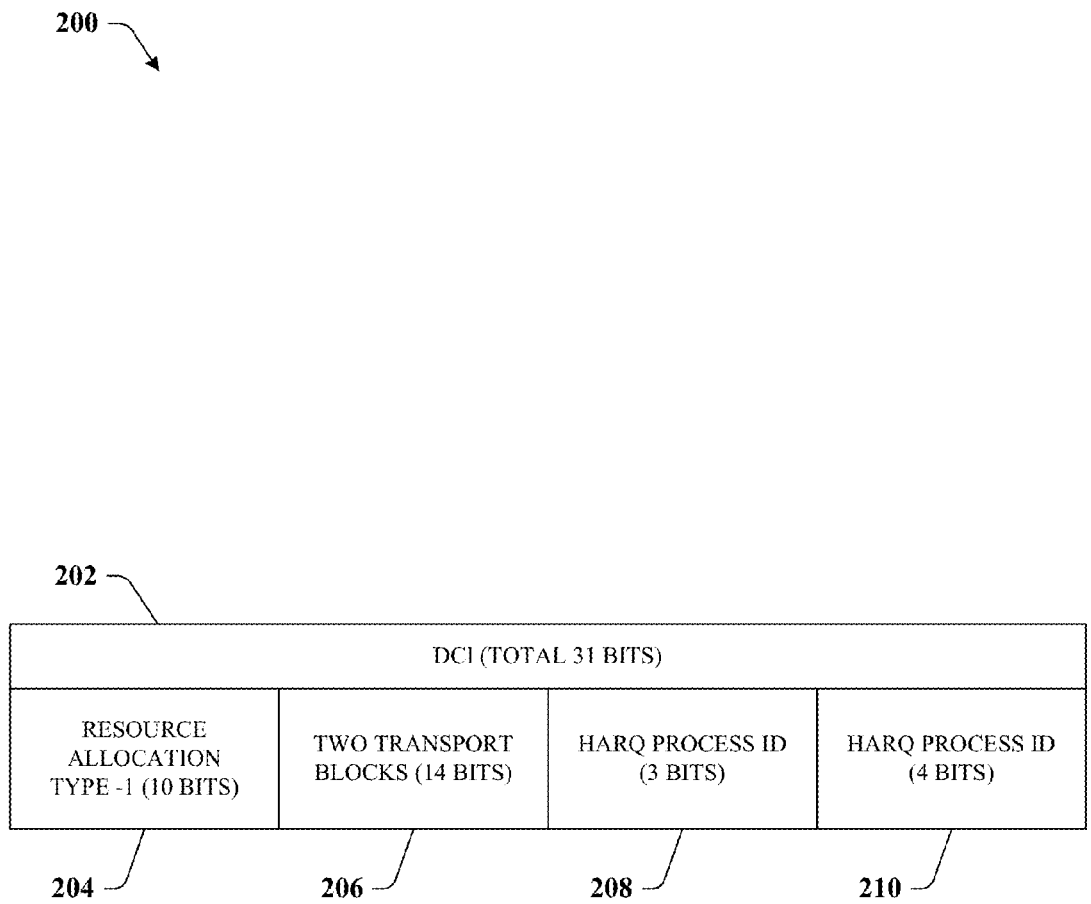
FIG. 2 illustrates an example block diagram of a generic and adaptively assembled downlink control information in accordance with various aspects and embodiments of the subject disclosure.

Turning now to FIG. 2, illustrated is an example block diagram 200 of a generic and adaptively assembled downlink control information in accordance with various aspects and embodiments of the subject disclosure. The embodiment shown in FIG. 2 is a exemplary downlink control information 202 comprising a series of four information segments, a resource allocation Type 1 segment that is 10 bits, a segment indicating two transport blocks that is 14 bits, a HARQ process ID segment that is 3 bits and another HARQ process ID segment that is 4 bits.

Figure 3:
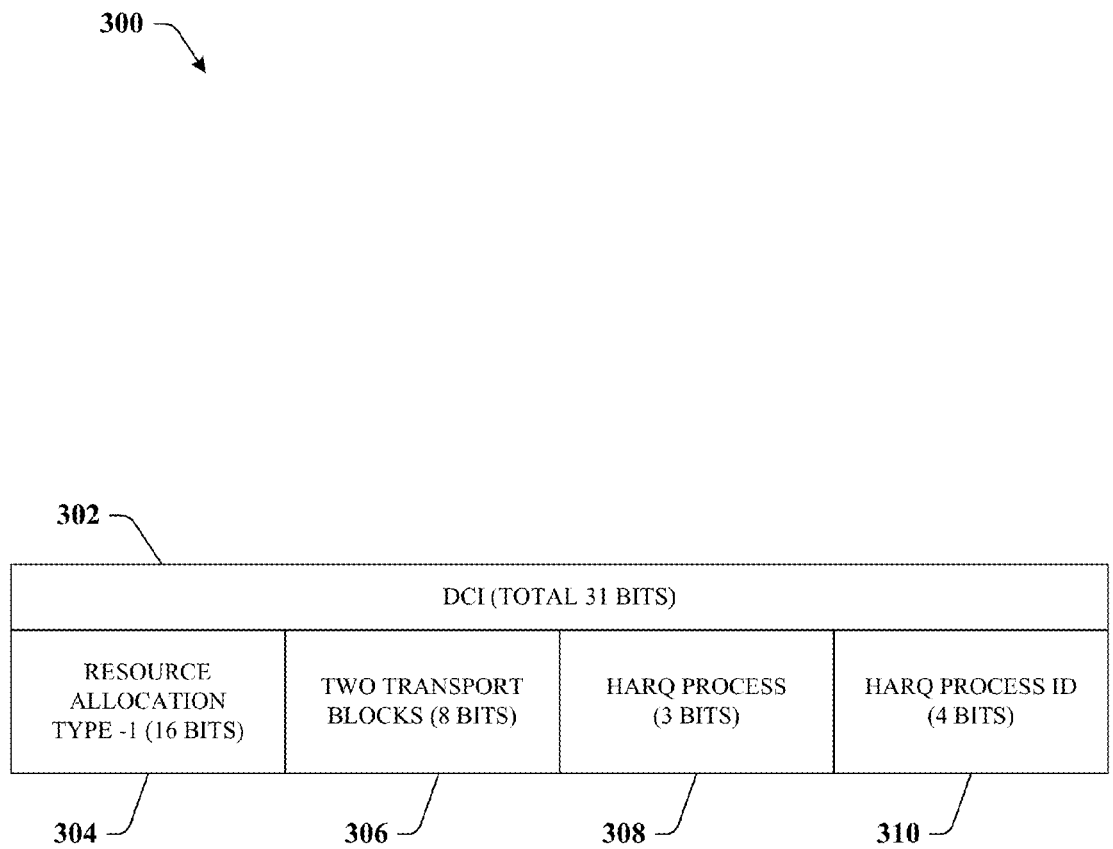
FIG. 3 illustrates an example block diagram of a generic and adaptively assembled downlink control information in accordance with various aspects and embodiments of the subject disclosure.

Similarly, in FIG. 3, another exemplary diagram 300 shows a downlink control information set 302 that also comprises four information segments. Downlink control information 302 comprises a resource allocation Type 1 segment that is 16 bits, a segment indicating two transport blocks that is 8 bits, a HARQ process ID segment that is 3 bits and another HARQ process ID segment that is 4 bits.

Each of downlink control information sets 202 and 302 are 31 bits in size, but the information segments are different sizes and so the UE that receives the DCI decodes the DCI to identify the individual information segments that comprise the DCI.

The base station device that assembled the downlink control information sets 202 and 302 selected the information segments from a set of available information segments based on the signaling requirements of the respective UEs and the downlink data transmissions. The UEs may have different contexts (features available, signal strengths, signal to noise ratio, etc.) that necessitate different signaling requirements and thus information segments. By only including the relevant and appropriate information segments, the base station device can increase the DCI efficiency by decreasing the amount of unnecessary DCI information sent, as well as decreasing the amount of time the UE spends trying to determine what type of DCI format the downlink control information is in.

It is to be appreciated that although the downlink control information sets 202 and 302 shown in FIGS. 2 and 3 respectively comprise 4 information segments, and are both 31 bits, in other embodiments, the downlink control information can comprise a different number of information segments with varying sizes.

In an embodiment, the base station device assembles the downlink control information sets 202 and 302 in response to initiation of radio resource control configuration management by the base station device.

Figure 4:
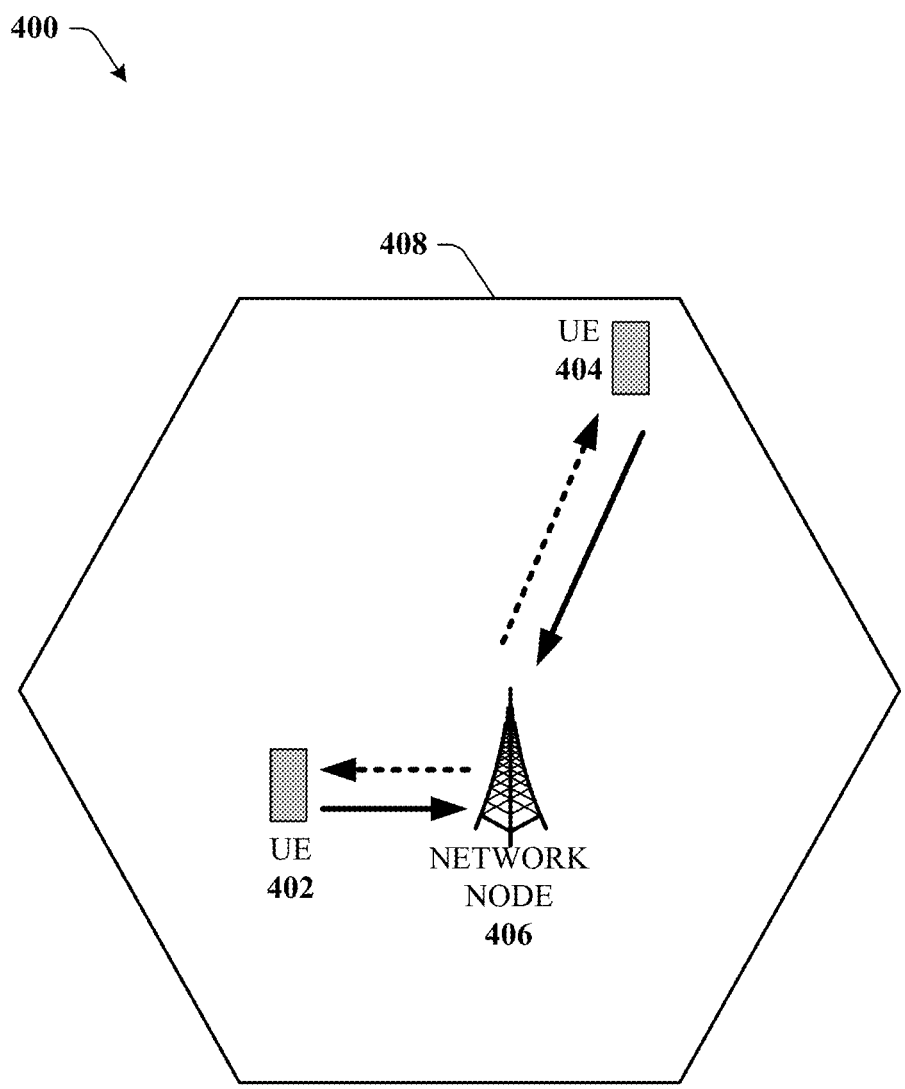
FIG. 4 illustrates an example wireless communication system in accordance with various aspects and embodiments of the subject disclosure.

FIG. 4 illustrates of an example wireless communication system 400 that facilitates the provision of a format indicator (FI) in accordance with various aspects and embodiments of the subject disclosure. In one or more embodiments, system 400 can comprise one or more user equipment UEs 404 and 402, which can have one or more antenna panels having vertical and horizontal elements. A UE 402 can be a mobile device such as a cellular phone, a smartphone, a tablet computer, a wearable device, a virtual reality (VR) device, a heads-up display (HUD) device, a smart car, a machine-type communication (MTC) device, and the like. User equipment UE 402 can also comprise IOT devices that communicate wirelessly. In various embodiments, system 400 is or comprises a wireless communication network serviced by one or more wireless communication network providers. In example embodiments, a UE 402 can be communicatively coupled to the wireless communication network via a network node 406.

The non-limiting term network node (or radio network node) is used herein to refer to any type of network node serving a UE 402 and UE 404 and/or connected to other network node, network element, or another network node from which the UE 402 or 404 can receive a radio signal. Network nodes can also have multiple antennas for performing various transmission operations (e.g., MIMO operations). A network node can have a cabinet and other protected enclosures, an antenna mast, and actual antennas. Network nodes can serve several cells, also called sectors, depending on the configuration and type of antenna. Examples of network nodes (e.g., network node 406) can include but are not limited to: NodeB devices, base station (BS) devices, access point (AP) devices, and radio access network (RAN) devices. The network node 406 can also include multi-standard radio (MSR) radio node devices, including but not limited to: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like. In 5G terminology, the node 406 can be referred to as a gNodeB device.

In example embodiments, the UE 402 and 404 can send and/or receive communication data via a wireless link to the network node 406. The dashed arrow lines from the network node 406 to the UE 402 and 404 represent downlink (DL) communications and the solid arrow lines from the UE 402 and 404 to the network nodes 406 represents an uplink (UL) communication.

Wireless communication system 400 can employ various cellular technologies and modulation schemes to facilitate wireless radio communications between devices (e.g., the UE 402 and 404 and the network node 406). For example, system 400 can operate in accordance with a UMTS, long term evolution (LTE), high speed packet access (HSPA), code division multiple access (CDMA), time division multiple access (TDMA), frequency division multiple access (FDMA), multi-carrier code division multiple access (MC-CDMA), single-carrier code division multiple access (SC-CDMA), single-carrier FDMA (SC-FDMA), OFDM, (DFT)-spread OFDM or SC-FDMA)), FBMC, ZT DFT-s-OFDM, GFDM, UFMC, UW DFT-Spread-OFDM, UW-OFDM, CP-OFDM, resource-block-filtered OFDM, and UFMC. However, various features and functionalities of system 400 are particularly described wherein the devices (e.g., the UEs 402 and 404 and the network device 406) of system 400 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.).

In various embodiments, system 400 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

In various embodiments, the network node 406 can send downlink control information to UE 402 and 404 to facilitate the downlink data transmissions. The network node can assemble the downlink control information from a set of information segments where each of the information segments represent a signaling function. The information segments can be selected from one or more sets of available segments based on the UE types and context of the UEs. For instance, UE 402 is near the network node 402 and so higher ranked transmission schemes can be used, therefore, the network node 406 may include an information segment relating to the MCS table for TB-2. By contrast, UE 404 is near the edge of network coverage area 408, and so will be unlikely to use the higher rank transmission schemes and so the MCS table for TB-2 would not be included in the downlink control information for UE 404.

The network node 406 can determine the context of the UE 402 and 404 using packets and other transmission received from the UEs to determine the signal strength or signal to noise ratio of communications between the UEs and the network node 406. In other embodiments, network node 406 can assemble the downlink control information based on the types of devices that UE 402 and 404 are. Certain features may not be available on UE 402 whilst being available on UE 404, where the features are associated with different type of signaling. In other embodiments, the network node 406 can determine the context of the UEs 402 and 404 based on network location information that identifies the locations of UEs 402 and 404.

Figure 5:
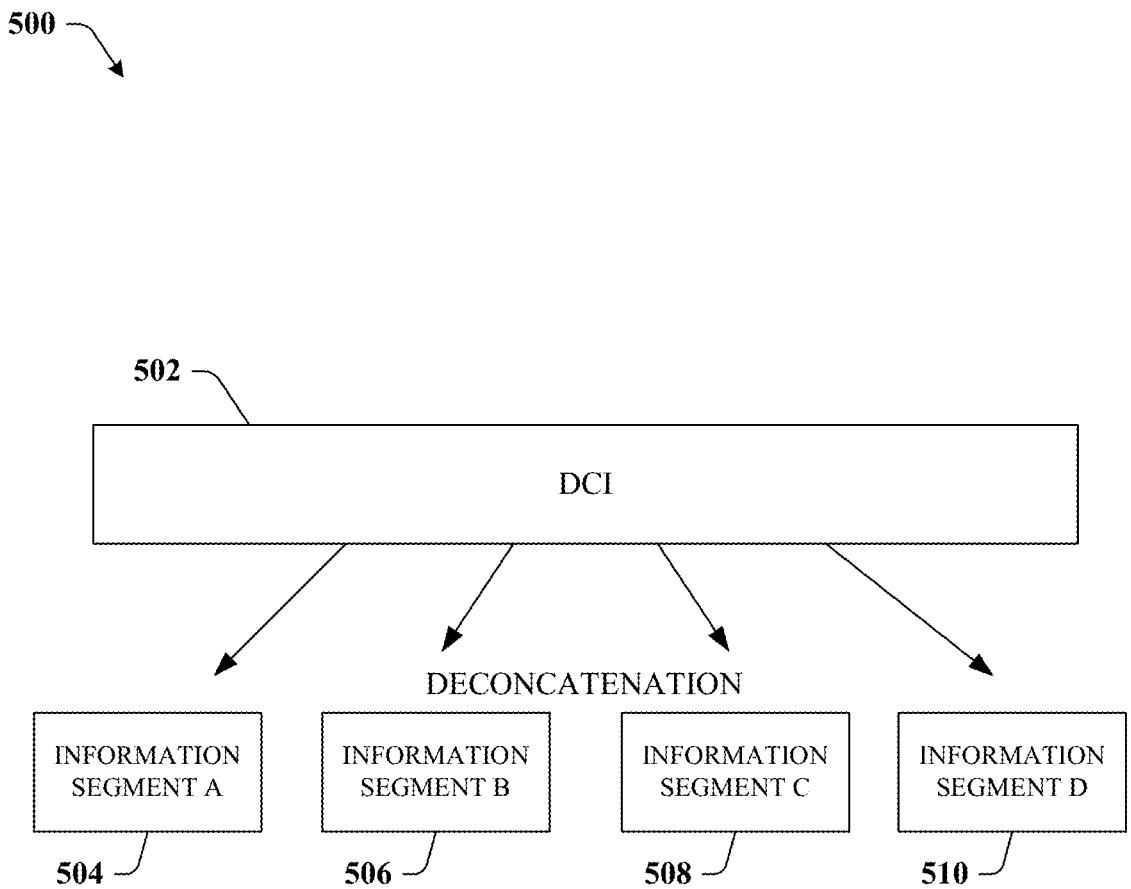
FIG. 5 illustrates an example block diagram of deconcatenated downlink control information in accordance with various aspects and embodiments of the subject disclosure.

Turning now to FIG. 5, illustrated is an example block diagram 500 of deconcatenated downlink control information in accordance with various aspects and embodiments of the subject disclosure.

A user equipment, (e.g., UE 402 or 404) can receive the downlink control information 502 from a base station device (e.g., network node 406). The downlink control information 502 can contain parameters that inform the UE how to receive and decode a downlink data transmission. The DCI 502 can be assembled from a set of information segments however, and the UE may not immediately be able to tell what information segments are included. The UE can determine the size of the DCI 502, and then using the size, in bits, deconcatenate the DCI 502 into respective information segments A 504, B, 506, C 508, and D 510. The UE can perform this decoding using an index that lists sizes of the information segments and types of information segments to determine where a first information segment ends, and another information segment begins.

Figure 6:
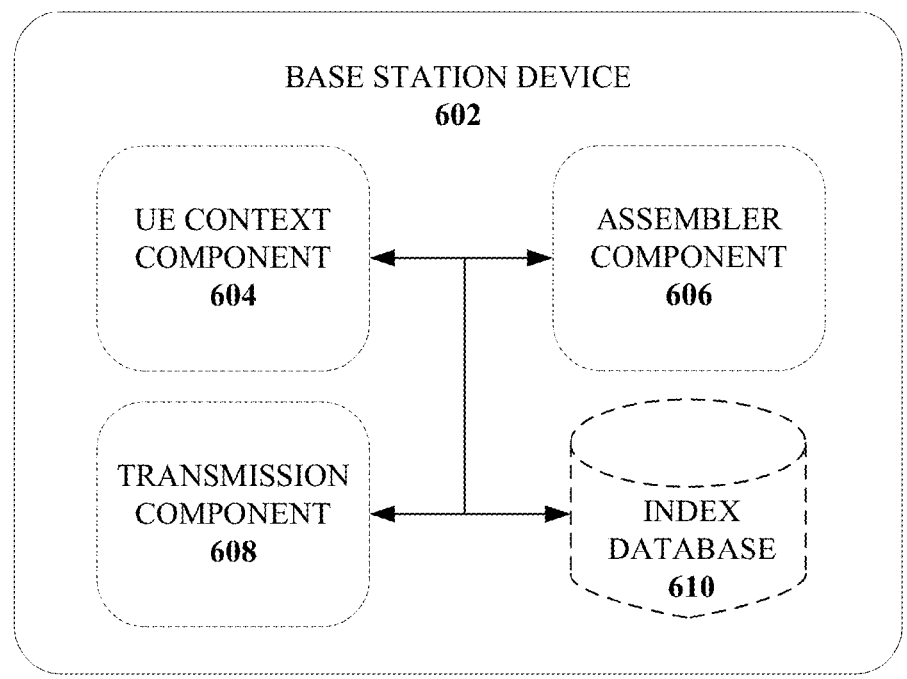
FIG. 6 illustrates an example block diagram of a base station device that can adaptively assemble downlink control information in accordance with various aspects and embodiments of the subject disclosure.

The index can be received by the user equipment in a transmission preceding the DCI 502. The index can list the types of information segments, function of the information segments, and the size of the information segments. The second transmission can then be the downlink control information comprising the set of information segments listed in the index sent in the first transmission. When the UE receives the DCI 502, the UE can decode the downlink control information using the index sent in the first transmission. By knowing the types of information segments, and the sizes of the information segments in the index received by the UE the UE can deconcatenate the downlink control information into the respective information segments, and interpret the indicator bits accordingly when receiving the downlink data Turning now to FIG. 6, illustrated is an example block diagram 600 of a base station device 602 that can adaptively assemble downlink control information in accordance with various aspects and embodiments of the subject disclosure.

Base station device 602 can include a UE context component 604 that can determine a context for the UE that the base station device 602 will be communicating with (e.g., mobile device 702). The UE context component 604 can determine what type of device the UE is, and what features are available for the device. The UE context component 604 can also determine the signal strength and/or signal to noise ratio of transmissions received from the UE (e.g., via a measurement report from the UE). The UE context component 604 may also receive location information to determine where the UE is located, and determine what features may or may not be available to the UE.

Based on the gathered context, the UE context component 604 can indicate what features are available for the downlink data transmission to the UE, and provide that information to the assembler component 606. The assembler component 606 can adaptively assemble the downlink control information by combining information segments comprising separate signaling functions. The assembler component 606 can use an index of available information segments stored in an index database 610. The assembler can generate an index comprising the information segments included in the downlink control information, as well as the sizes of the information segments.

Once the downlink control information has been assembled, the transmission component 608 can transmit the index generated by the assembler component 606 and the downlink control information to the UE, and then transmit the downlink data to the UE based on the parameters contained in the downlink control information.

Figure 7:
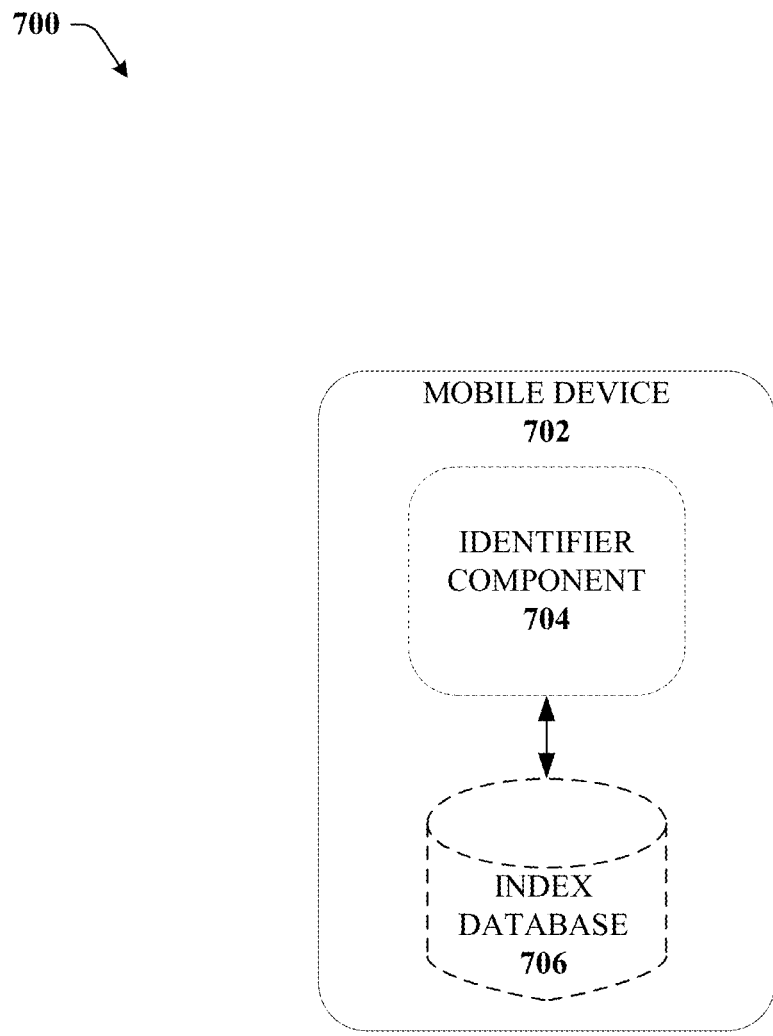
FIG. 7 illustrates an example block diagram of a mobile device that can decode and interpret adaptively assembled downlink control information in accordance with various aspects and embodiments of the subject disclosure.

Turning now to FIG. 7, illustrated is an example block diagram 700 of a mobile device 702 that can decode and interpret adaptively assembled downlink control information in accordance with various aspects and embodiments of the subject disclosure.

The mobile device 702 can receive the downlink control information from a base station device (e.g., base station device 602). An identifier component 704 can decode the downlink control information by deconcatenating the downlink control information into individual, identifiable information segments and then interprets the signaling bits as it would for a predetermined DCI format. The identifier component 704 can determine the total size of the downlink control information. Based on the total size, and using an index database 706 that comprises an index of information segments that list the sizes of the information segments, the identifier component 704 can determine which information segments have been included in the downlink control information and identify where bits of one end, and the bits of another information segment begin in order to properly interpret the downlink control information.

Figure 8:
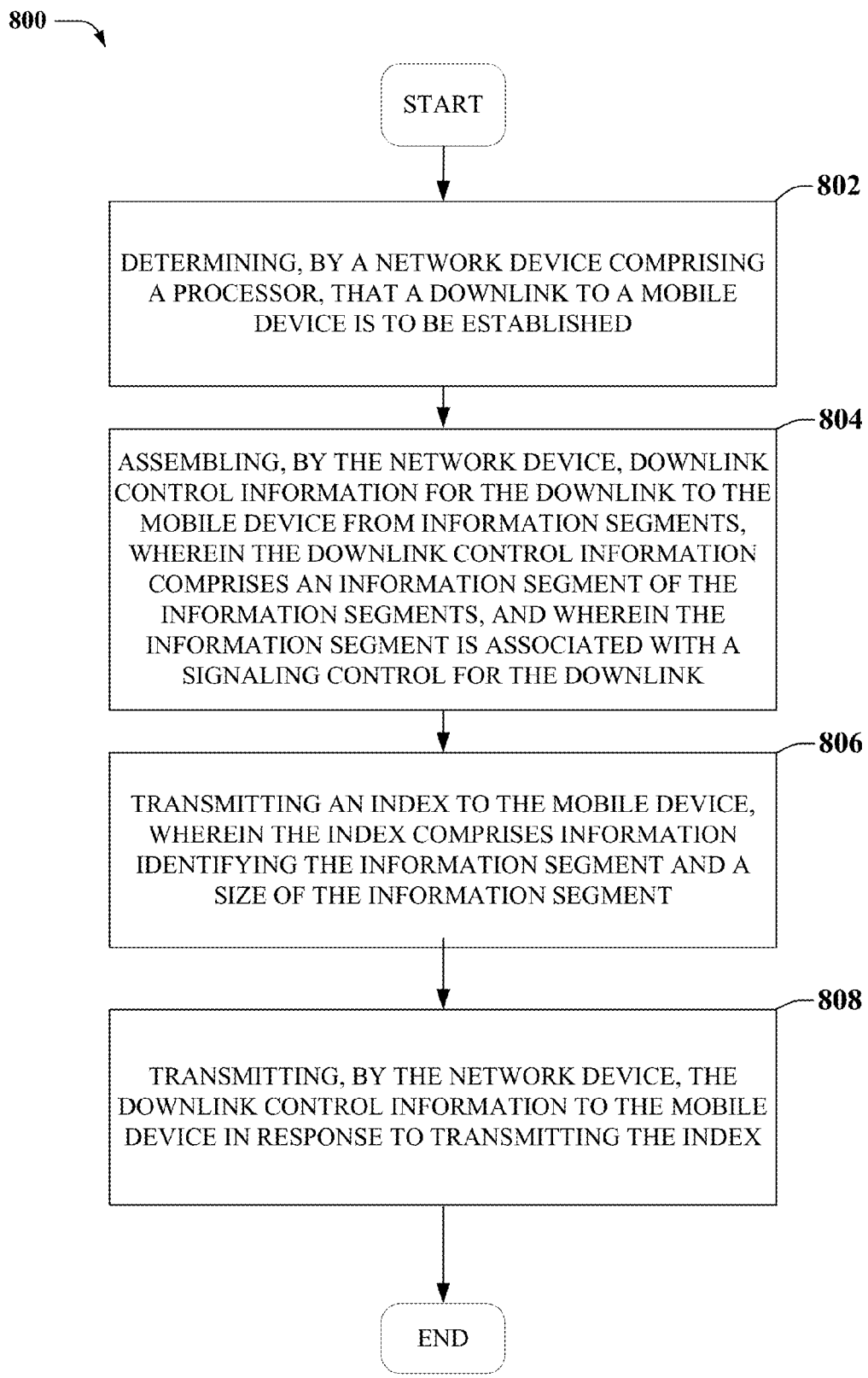
FIG. 8 illustrates an example method for adaptively assembling downlink control information in accordance with various aspects and embodiments of the subject disclosure.
Figure 9:
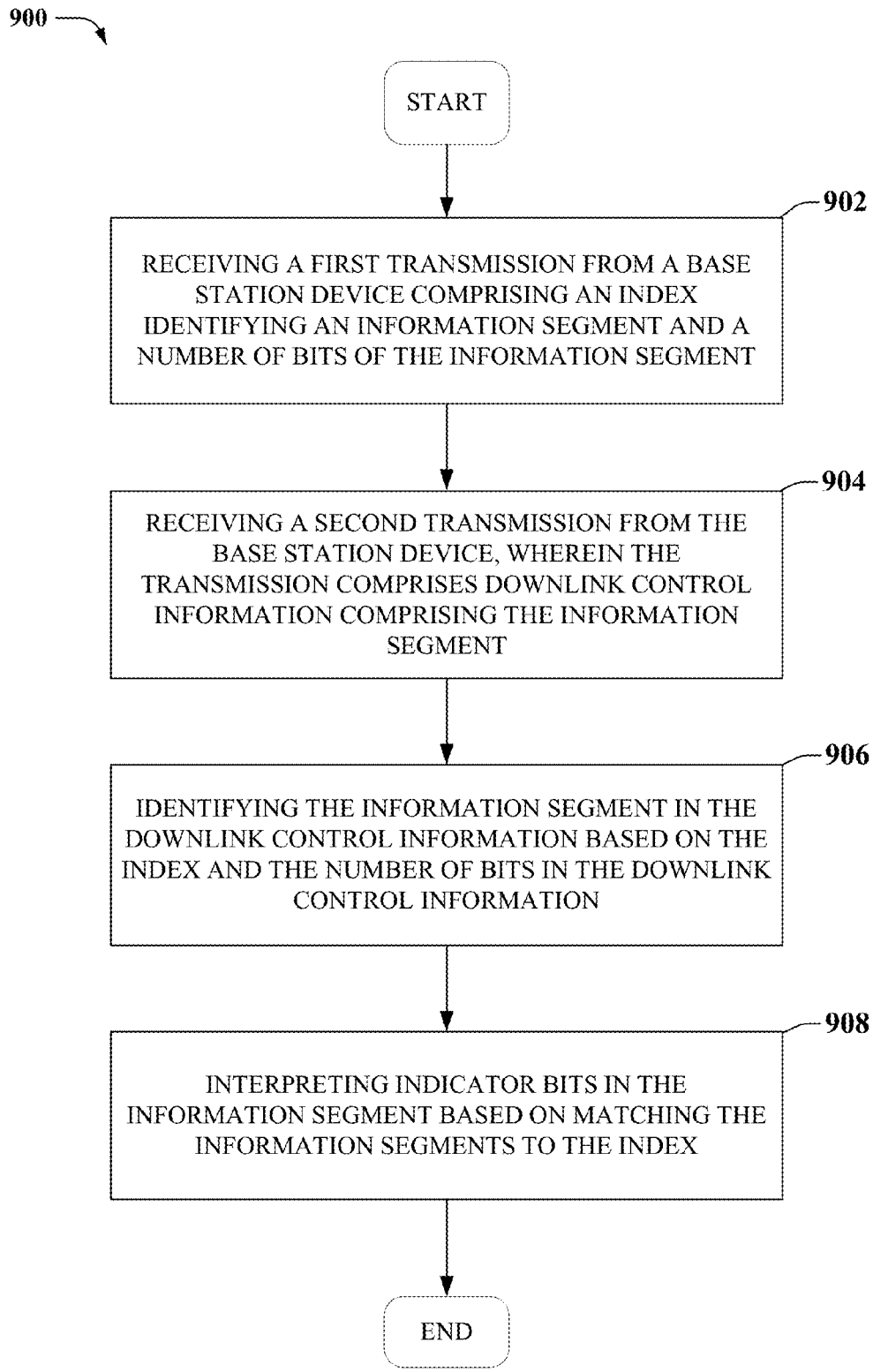
FIG. 9 illustrates an example method for decoding and interpreting adaptively assembled downlink control information by a mobile device in accordance with various aspects and embodiments of the subject disclosure.

FIGS. 8-9 illustrates a process in connection with the aforementioned systems. The process in FIGS. 8-9 can be implemented for example by the systems in FIGS. 6-7 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Turning now to FIG. 8, illustrated is an example method 800 for adaptively assembling downlink control information in accordance with various aspects and embodiments of the subject disclosure.

Method 800 can begin at 802, where the method includes determining, by a network device comprising a processor, that a downlink to a mobile device is to be established. The method continues at 804 where the method includes assembling, by the network device, downlink control information for the downlink to the mobile device from information segments, wherein the downlink control information comprises an information segment of the information segments, and wherein the information segment is associated with a signaling control for the downlink. The assembly can be performed in an embodiment by the assembler component (e.g., assembler component 606). The information segments can be selected from a set of information segments that are listed in an index of available information segments.

At 806, the method includes transmitting an index to the mobile device, wherein the index comprises information identifying the information segment and a size of the information segment (e.g., by transmission component 608).

At 808, the method includes transmitting, by the network device, the downlink control information to the mobile device in response to transmitting the index.

Turning now to FIG. 9, illustrated is an example method 900 for decoding and interpreting adaptively assembled downlink control information by a mobile device in accordance with various aspects and embodiments of the subject disclosure.

Method 900 can begin at 902, where the method includes receiving a first transmission from a base station device comprising an index identifying an information segment and a number of bits of the information segment.

At 904, the method includes receiving a second transmission from the base station device, wherein the transmission comprises downlink control information comprising the information segment.

At 906, the method includes identifying the information segment in the downlink control information based on the index and the number of bits in the downlink control information.

At 908, the method includes interpreting indicator bits in the information segment based on matching the information segments to the index.

Figure 10:
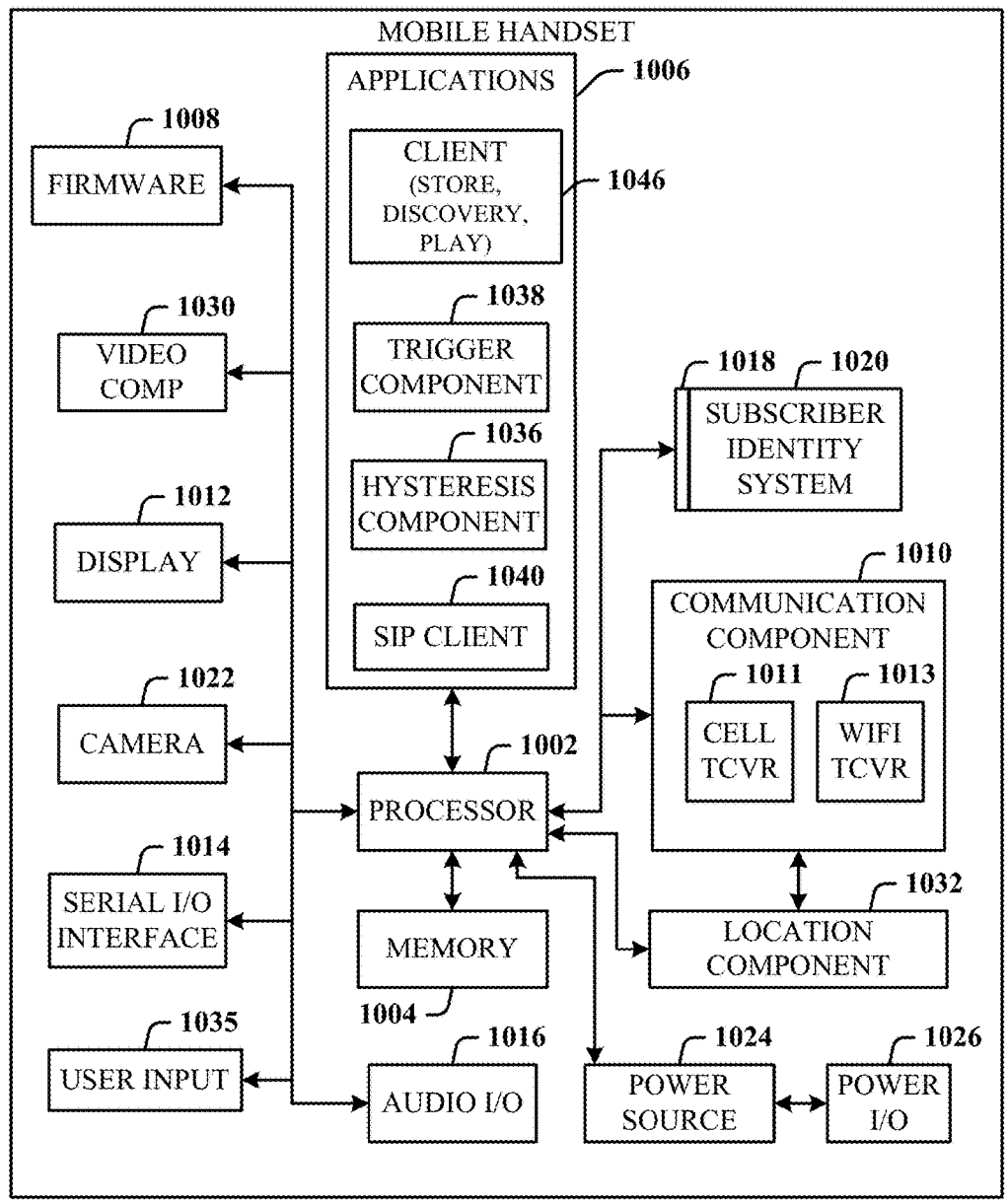
FIG. 10 illustrates an example block diagram of an example user equipment that can be a mobile handset operable to provide a format indicator in accordance with various aspects and embodiments of the subject disclosure.

Referring now to FIG. 10, illustrated is a schematic block diagram of an example end-user device such as a user equipment (e.g., user equipment 104, 402, 404, or 702) that can be a mobile device 1000 capable of connecting to a network in accordance with some embodiments described herein. Although a mobile handset 1000 is illustrated herein, it will be understood that other devices can be a mobile device, and that the mobile handset 1000 is merely illustrated to provide context for the embodiments of the various embodiments described herein. The following discussion is intended to provide a brief, general description of an example of a suitable environment 1000 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1000 includes a processor 1002 for controlling and processing all onboard operations and functions. A memory 1004 interfaces to the processor 1002 for storage of data and one or more applications 1006 (e.g., a video player software, user feedback component software, etc.). Other applications can include voice recognition of predetermined voice commands that facilitate initiation of the user feedback signals. The applications 1006 can be stored in the memory 1004 and/or in a firmware 1008, and executed by the processor 1002 from either or both the memory 1004 or/and the firmware 1008. The firmware 1008 can also store startup code for execution in initializing the handset 1000. A communications component 1010 interfaces to the processor 1002 to facilitate wired/wireless communication with external systems, e.g., cellular networks, VoIP networks, and so on. Here, the communications component 1010 can also include a suitable cellular transceiver 1011 (e.g., a GSM transceiver) and/or an unlicensed transceiver 1013 (e.g., Wi-Fi, WiMax) for corresponding signal communications. The handset 1000 can be a device such as a cellular telephone, a PDA with mobile communications capabilities, and messaging-centric devices. The communications component 1010 also facilitates communications reception from terrestrial radio networks (e.g., broadcast), digital satellite radio networks, and Internet-based radio services networks.

The handset 1000 includes a display 1012 for displaying text, images, video, telephony functions (e.g., a Caller ID function), setup functions, and for user input. For example, the display 1012 can also be referred to as a "screen" that can accommodate the presentation of multimedia content (e.g., music metadata, messages, wallpaper, graphics, etc.). The display 1012 can also display videos and can facilitate the generation, editing and sharing of video quotes. A serial I/O interface 1014 is provided in communication with the processor 1002 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1000, for example. Audio capabilities are provided with an audio I/O component 1016, which can include a speaker for the output of audio signals related to, for example, indication that the user pressed the proper key or key combination to initiate the user feedback signal. The audio I/O component 1016 also facilitates the input of audio signals through a microphone to record data and/or telephony voice data, and for inputting voice signals for telephone conversations.

The handset 1000 can include a slot interface 1018 for accommodating a SIC (Subscriber Identity Component) in the form factor of a card Subscriber Identity Module (SIM) or universal SIM 1020, and interfacing the SIM card 1020 with the processor 1002. However, it is to be appreciated that the SIM card 1020 can be manufactured into the handset 1000, and updated by downloading data and software.

The handset 1000 can process IP data traffic through the communication component 1010 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1022 (e.g., a camera) can be provided for decoding encoded multimedia content. The video processing component 1022 can aid in facilitating the generation, editing and sharing of video quotes. The handset 1000 also includes a power source 1024 in the form of batteries and/or an AC power subsystem, which power source 1024 can interface to an external power system or charging equipment (not shown) by a power I/O component 1026.

The handset 1000 can also include a video component 1030 for processing video content received and, for recording and transmitting video content. For example, the video component 1030 can facilitate the generation, editing and sharing of video quotes. A location tracking component 1032 facilitates geographically locating the handset 1000. As described hereinabove, this can occur when the user initiates the feedback signal automatically or manually. A user input component 1034 facilitates the user initiating the quality feedback signal. The user input component 1034 can also facilitate the generation, editing and sharing of video quotes. The user input component 1034 can include such conventional input device technologies such as a keypad, keyboard, mouse, stylus pen, and/or touch screen, for example.

Referring again to the applications 1006, a hysteresis component 1036 facilitates the analysis and processing of hysteresis data, which is utilized to determine when to associate with the access point. A software trigger component 1038 can be provided that facilitates triggering of the hysteresis component 1038 when the Wi-Fi transceiver 1013 detects the beacon of the access point. A SIP client 1040 enables the handset 1000 to support SIP protocols and register the subscriber with the SIP registrar server. The applications 1006 can also include a client 1042 that provides at least the capability of discovery, play and store of multimedia content, for example, music.

The handset 1000, as indicated above related to the communications component 810, includes an indoor network radio transceiver 1013 (e.g., Wi-Fi transceiver). This function supports the indoor radio link, such as IEEE 802.11, for the dual-mode GSM handset 1000. The handset 1000 can accommodate at least satellite radio services through a handset that can combine wireless voice and digital radio chipsets into a single handheld device.

Figure 11:
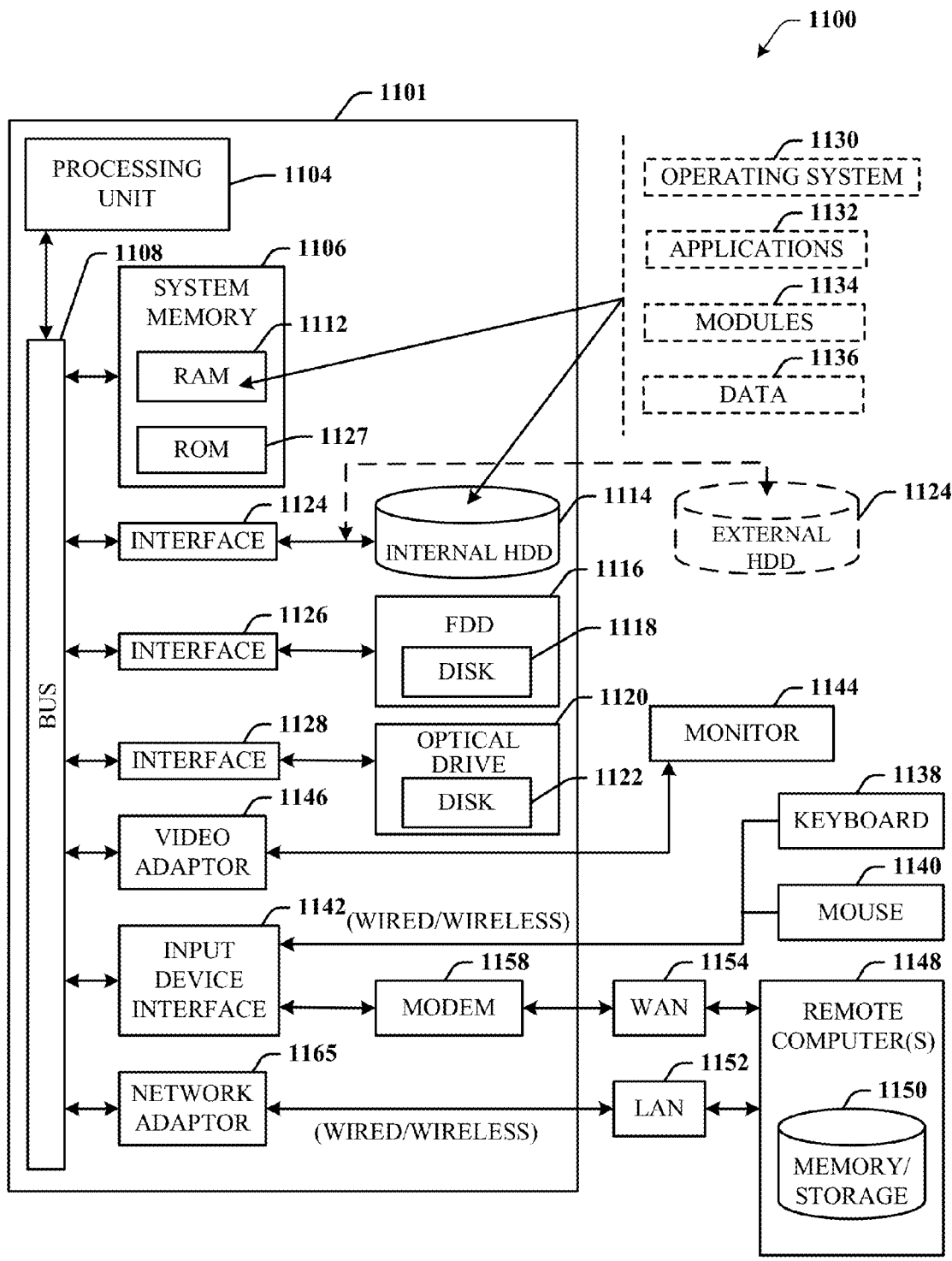
FIG. 11 illustrates an example block diagram of a computer that can be operable to execute processes and methods in accordance with various aspects and embodiments of the subject disclosure.

Referring now to FIG. 11, there is illustrated a block diagram of a computer 1100 operable to execute the functions and operations performed in the described example embodiments. For example, a network node (e.g., network node 406) may contain components as described in FIG. 11. The computer 1100 can provide networking and communication capabilities between a wired or wireless communication network and a server and/or communication device. In order to provide additional context for various aspects thereof, FIG. 11 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 11, implementing various aspects described herein with regards to the end-user device can include a computer 1100, the computer 1100 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes read-only memory (ROM) 1127 and random access memory (RAM) 1112. A basic input/output system (BIOS) is stored in a non-volatile memory 1127 such as ROM, EPROM, EEPROM, which BIOS contains the basic routines that help to transfer information between elements within the computer 1100, such as during start-up. The RAM 1112 can also include a high-speed RAM such as static RAM for caching data.

The computer 1100 further includes an internal hard disk drive (HDD) 1114 (e.g., EIDE, SATA), which internal hard disk drive 1114 can also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1100 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1100, such as zip drives, magnetic cassettes, flash memory cards, cartridges, and the like, can also be used in the example operating environment, and further, that any such media can contain computer-executable instructions for performing the methods of the disclosed innovation.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is to be appreciated that the innovation can be implemented with various commercially available operating systems or combinations of operating systems.

A user can enter commands and information into the computer 1100 through one or more wired/wireless input devices, e.g., a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 2394 serial port, a game port, a USB port, an IR interface, etc.

A monitor 1144 or other type of display device is also connected to the system bus 1108 through an interface, such as a video adapter 1146. In addition to the monitor 1144, a computer 1100 typically includes other peripheral output devices (not shown), such as speakers, printers, etc.

The computer 1100 can operate in a networked environment using logical connections by wired and/or wireless communications to one or more remote computers, such as a remote computer(s) 1148. The remote computer(s) 1148 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1100 is connected to the local network 1152 through a wired and/or wireless communication network interface or adapter 1156. The adapter 1156 may facilitate wired or wireless communication to the LAN 1152, which may also include a wireless access point disposed thereon for communicating with the wireless adapter 1156.

When used in a WAN networking environment, the computer 1100 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 through the input device interface 1142. In a networked environment, program modules depicted relative to the computer, or portions thereof, can be stored in the remote memory/storage device 1150. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprises a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A base station device, comprising:
a processor; and
a memory that stores executable instructions that, when executed by the processor, facilitate performance of operations, comprising:
determining that a downlink to a mobile device is to be established;
assembling downlink control information for the downlink to the mobile device from a group of information segments, wherein the downlink control information comprises an information segment of the group of information segments, and wherein the information segment is associated with a signaling control for the downlink;

transmitting an index to the mobile device, wherein the index comprises information identifying the information segment and a size of the information segment and wherein the index facilitates decoding of the downlink control information by the mobile device; and transmitting the downlink control information to the mobile device after transmitting the index to the mobile device.

2. The base station device of claim 1, wherein the operations further comprise:

selecting the information segment from the group of information segments based on a context of the mobile device.

3. The base station device of claim 2, wherein the context is determined based on a signal strength of the mobile device.

4. The base station device of claim 2, wherein the operations further comprise:

determining the context for the mobile device based on a signal received from the mobile device.

5. The base station device of claim 2, wherein the operations further comprise:

determining the context for the mobile device based on a type of the mobile device.

6. The base station device of claim 2, wherein the operations further comprise:

determining the context for the mobile device based on a location of the mobile device.

7. The base station device of claim 1, wherein the assembling further comprises:

assembling the downlink control information based on information segments selected from respective sub groups of the group of information segments.

8. The base station device of claim 1, wherein the transmitting the index to the mobile device is via radio resource control management.

9. The base station device of claim 1, wherein the operations further comprise:

assembling the downlink control information based on multiple indexes that each comprises information identifying a type of the information segment, a size of the information segments and a function of the information segment.

10. The base station device of claim 1, wherein respective sub groups of the group of information segments correspond to different functions.

11. A mobile device, comprising:

a processor; and a memory that stores executable instructions that, when executed by the processor, facilitate performance of operations, comprising:

receiving a first transmission from a base station device comprising an index identifying an information segment and a number of bits of the information segment;

receiving a second transmission from the base station device, wherein the transmission comprises downlink control information comprising the information segment;

identifying the information segment in the downlink control information based on the index and the number of bits in the downlink control information; and decoding downlink control information in the information segment based on the identifying the information segment.

12. The mobile device of claim 11, wherein the operations further comprise:

managing a downlink data transmission from the base station device based on the downlink control information.

13. The mobile device of claim 11, wherein the identifying the information segment in the downlink control information comprises:

deconcatenating the downlink control information into separate information segments based on a number of bits of an individual information segment of the information segments.

14. The mobile device of claim 13, wherein the receiving the first transmission further comprises receiving the first transmission via radio resource control management.

15. A method comprising;

determining, by a network device comprising a processor, that a downlink to a mobile device is to be established;

assembling, by the network device, downlink control information for the downlink to the mobile device from information segments, wherein the downlink control information comprises an information segment of the information segments, and wherein the information segment is associated with a signaling control for the downlink;

transmitting an index to the mobile device, wherein the index comprises information identifying the information segment and a size of the information segment and wherein the index facilitates decoding of the downlink control information by the mobile device; and transmitting, by the network device, the downlink control information to the mobile device after transmitting the index.

16. The method of claim 15, further comprising:

selecting, by the network device, the information segment from the information segments based on a context of the mobile device.

17. The method of claim 16, further comprising:

determining, by the network device, the context for the mobile device based on a signal received from the mobile device.

18. The method of claim 16, further comprising:

determining, by the network device, the context for the mobile device based on a type of the mobile device.

19. The method of claim 16, further comprising:

determining, by the network device, the context for the mobile device based on a location of the mobile device.

20. The method of claim 15, further comprising:

assembling, by the network device, the downlink control information based on an index that comprises information identifying types of information segments, size of the information segments and functions of the information segments.

* * * * *